United States Patent [19]
Inokuchi et al.

[11] Patent Number: 5,666,275
[45] Date of Patent: Sep. 9, 1997

[54] CONTROL SYSTEM FOR POWER CONVERSION SYSTEM

[75] Inventors: Haruhisa Inokuchi; Noriko Kawakami, both of Tokyo; Hirokazu Suzuki, Kanagawa; Ken-Ichi Suzuki; Koji Sakamoto, both of Kanagawa-ken, all of Japan

[73] Assignees: Kabushiki Kaisha Toshiba, Kawasaki; Tokyo Electron Power Company Incorporated, Tokyo, both of Japan

[21] Appl. No.: 701,986

[22] Filed: Aug. 23, 1996

[30]  Foreign Application Priority Data

Sep. 5, 1995  [JP]  Japan .................................. 7-227892

[51] Int. Cl.$^6$ ........................... H02M 3/36; G05F 1/70
[52] U.S. Cl. ........................ 363/35; 363/37; 323/207
[58] Field of Search .............................. 323/205, 207; 363/34, 35, 37

[56]  References Cited

U.S. PATENT DOCUMENTS

| | | | |
|---|---|---|---|
| 4,494,179 | 1/1985 | Inokuchi et al. | 363/35 |
| 4,578,743 | 3/1986 | Inokuchi et al. | 363/35 |
| 4,903,184 | 2/1990 | Hirose | 363/37 |
| 5,010,467 | 4/1991 | Tokiwa et al. | 363/37 |
| 5,450,311 | 9/1995 | Esparza Olcina | 323/207 |

OTHER PUBLICATIONS

Yukio Tokiwa, et al. "Novel Control Strategies for HVDC System with Self-Contained Converter", Electrical Engineering in Japan, vol. 113, No. 5. (pp. 1–13), 1993.

*Primary Examiner*—Matthew V. Nguyen
*Attorney, Agent, or Firm*—Oblon, Spivak, McClelland, Maier & Neustadt, P.C.

[57]  ABSTRACT

A control system for a power conversion system composed of a plurality of power converters, each of which is connected between one of a plurality of AC power systems and a DC line to exchange an electric power between them, respectively. The control system is composed of a plurality of control units, each of which includes units for detecting an AC current flowing between the AC power system and the power converter, an AC voltage of the AC power system, and a DC voltage of the power converter, and a unit for detecting an active power and a reactive power exchanged between the power converter and the AC power system. Each of the control units further includes an active power control unit for generating an active current command so that the DC voltage drops with the increase of one of the active power and a DC current, a unit for setting a reactive power reference, a reactive power control unit for comparing the reactive power reference and the reactive power to obtain a reactive power difference and for generating a reactive current command so as to bring the reactive power difference close to zero, a current control unit for generating a plurality of output voltage commands so as to coincide the AC current to the active and reactive current commands, and a gate control unit for switching the semiconductor switching devices in the power converter based on the output voltage commands.

8 Claims, 13 Drawing Sheets

CONTROL SYSTEM FOR POWER CONVERSION SYSTEM

BACKGROUND OF THE INVENTION

1. Field of the Invention

This invention relates to a control system for a power conversion system, and more particularly to a control system for a power conversion system used in, such as an interconnection system, composed of a plurality of power converters for converting AC power into DC power or DC power into AC power, connected between a plurality of AC power systems and a DC line, for exchanging electric power between the AC power systems and the DC line.

2. Description of the Related Art

FIG. 18 is a schematic block diagram showing one example of a main circuit of a conventional voltage source type self-commutated power conversion system (hereinafter referred to as a power conversion system). A power conversion system 100 is composed of a power converter 10, a DC capacitor 20, a linked reactor 30 and a converter transformer 40, and is connected between a DC line containing a DC power source 50 and an AC power system containing an AC system power source 60.

The principle of operation of power conversion system 100 composed of power converter 10, DC capacitor 20, linked reactor 30 and converter transformer 40 shown in FIG. 18, connected between a DC line and an AC power system for exchanging electric power between them is publicly known. For instance, it is described in pages 216 through 220 of "Semiconductor Power Conversion Circuit", an edition of the Semiconductor Power Conversion System Research Specialized Committee of the Institute of Electrical Engineers of Japan (the first edition was published on Mar. 31, 1987).

FIG. 19 shows one example of a main circuit of power converter 10. This circuit is composed of a plurality of bridge-connected self-turn-off devices (6 pieces here), for instance, gate turn-off thyristors GU, GV, GW, GX, GY and GZ, and diodes DU, DV, DW, DX, DY and DZ connected in anti-parallel to these thyristors, and is provided with DC terminals PT and NT, and AC terminals R, S and T.

FIG. 20 shows one example of a conventional control system of a power conversion system 100, and the same portions as shown in FIGS. 18 and 19 are assigned with the same reference numerals and the explanation thereof will omitted. A current transformer 45 detects AC current i flowing between converter transformer 40 and AC system power source 60. A potential transformer 46 detects AC voltage v applied at between converter transformer 40 and AC system power source 60.

A power detector (PQ detection) 70 detects an active power Pd and a reactive power Qd by AC current i detected by current transformer 45 and AC voltage v detected by potential transformer 46.

A power control system 80 is composed of an active power reference setter 71, a reactive power reference setter 72, an active power controller (APR) 73, a reactive power controller (AQR) 74, a voltage phase detector (PLL) 75, a constant current control circuit (ACR) 76, and comparators 77, 78.

Comparator 77 compares an active power reference Pdp that is set by active power reference setter 71 with active power detected value Pd that is detected by power detector 70 and obtains a difference between them. Active power controller 73 inputs from comparator 77 the difference between active power reference Pdp and active power detected value Pd and outputs an active current command value Ipref so as to minimize the difference.

Comparator 78 compares a reactive power reference Qdp that is set by reactive power reference setter 72 with reactive power detected value Qd that is detected by power detector 70 and obtains a difference between them. Reactive power controller 74 inputs from comparator 78 the difference between reactive power reference Qdp and reactive power detected value Qd and outputs a reactive current command value Iqref so as to minimize the difference.

Constant current control circuit (ACR) 76 receives AC current i detected by current transformer 45, AC voltage v detected by potential transformer 46, a system phase θ detected by voltage phase detector 75, and acts to coincide system current detected value i to active current command value Ipref that is output from active power controller 73 and reactive current command value Iqref that is output from reactive power Controller 74 using system phase signal θ detected by voltage phase detector 75 and system voltage signal v, and outputs output voltage command values Vuc, Vvc and Vwc.

The principle of constant current control circuit 76 is disclosed in Japanese Patent Publication (Kakai) No. Hei 1-77110. The examples of constant current control circuit 76 are disclosed in a literature titled "Application of a digital instantaneous current control for static induction thyristor converter in the utility line", PCIM Proceeding (Dec. 8, 1988) by Shun-ichi Hirose, et al. and others and therefore, the detailed explanation is omitted here.

A gate control circuit 90 decides a firing pattern (ON/OFF timing) for each device of power converter 10 according to output voltage command values Vuc, Vvc and Vwc that are output from constant current control circuit 76.

FIG. 21 shows an example of a control system of a power conversion system, where DC power source 50 in FIG. 20 is constructed by a voltage source type self-commutated power conversion system 100B which is almost in the same construction as voltage source type self-commutated conversion system 100, and the same reference numerals suffixed with A or B are assigned to the same parts as in FIG. 20 and the explanations thereof are omitted.

In power conversion system 100B, a comparator 84 obtains a difference between DC voltage reference Edp set by a DC voltage reference setter 79 and DC voltage detected value Ed detected by DC voltage detector 21. A DC voltage controller (AVR) 81 inputs from comparator 84 the difference between DC voltage reference Edp and DC voltage detected value Ed and outputs active current command value Ipref so as to minimize the difference.

When power conversion systems 100A and 100B are constructed as explained above, it becomes possible to interchange electric power as desired between an AC system power source 60A and an AC system power source 60B by setting and controlling DC voltage reference Edp and DC voltage Ed in power conversion system 100B and by setting and controlling active power reference Pdp and active power Pd in power conversion system 100A.

In the construction as shown in FIG. 21, it becomes no longer possible to maintain DC voltage Ed, if power conversion system 100B which is controlling DC voltage Ed becomes faulty and stops to run, or if AC system power source 60B causes such troubles as ground fault and power conversion system 100B stops to run. If stopped power converter 100B is operated as a rectifier, it becomes not possible to supply power and DC undervoltage is generated.

Further, if power conversion system 100B is operated as an inverter, it becomes not possible to consume power and DC overvoltage is generated.

As described above, according to the conventional art, there are such defects that when the DC sides of power conversion systems are connected for interchanging electric power between two AC power systems, if one power conversion system stops to run for the fault of the power conversion system or for ground fault of the power system, DC overvoltage or DC undervoltage are generated, and as a result, the other normal power conversion system also stops to run.

In particular, when electric power is interchanged by more than 3 power conversion systems with the DC sides of more than 3 power conversion systems connected, there is such a defect that when one power conversion system stops to run although it is possible to interchange electric power by two normal power conversion systems, it becomes not possible to interchange power as the normal power conversion systems also stop to run because of DC overvoltage or DC undervoltage.

In a system used practically shown in FIG. 21, considering also the case that power conversion system 100A controls the DC voltage and power conversion system 100B controls the active power, a DC voltage reference Setter 79A, a comparator 84A and a DC voltage controller 81A are provided in power conversion system 100A, and an active power reference setter 71B, a comparator 77B and an active power controller 73B are provided in power conversion system 100B, though not shown in FIG. 21.

SUMMARY OF THE INVENTION

Accordingly, one object of this invention is to provide a control system for a power conversion system composed of a plurality of power converters connected between a plurality of AC power systems and a DC line for exchanging electric power between the AC power systems and the DC line, which is capable to continue the operation of the remaining normal power converter even when one of the power converters stops to run due to a system accident or a failure of the power converter.

These and other objects of this invention can be achieved by providing a control system for a power conversion system composed of a plurality of power converters, each of which is composed of a plurality of semiconductor switching devices, converts AC power into DC power or DC power into AC power, is connected between one of a plurality of AC power systems and a DC line to exchange an electric power between one of the AC power systems and the DC line, respectively. The control system is composed of a plurality of control units, each of which is provided for one of the power converters, respectively. Each of the control units includes a unit for detecting an AC current flowing between the AC power system and the power converter, a unit for detecting an AC voltage of the AC power system, a unit for detecting a DC voltage of the power converter, and a unit for detecting an active power and a reactive power exchanged between the power converter and the AC power system based on the AC current and the AC voltage. Each of the control units further includes, an active power control unit for generating an active current command so that the DC voltage drops with the increase of one of the active power and a DC current flowing between the DC line and the power converter, a unit for setting a reactive power reference for exchanging between the power converter and the AC power system, a reactive power control unit for comparing the reactive power reference and the reactive power to obtain a reactive power difference and for generating a reactive current command so as to bring the reactive power difference close to zero, a current control unit for generating a plurality of output voltage commands so as to coincide the AC current to the active current command and the reactive current command based on the AC current, the AC voltage, the active current command and the reactive current command, and a gate control unit for switching the semiconductor switching devices in the power converter based on the output voltage commands.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
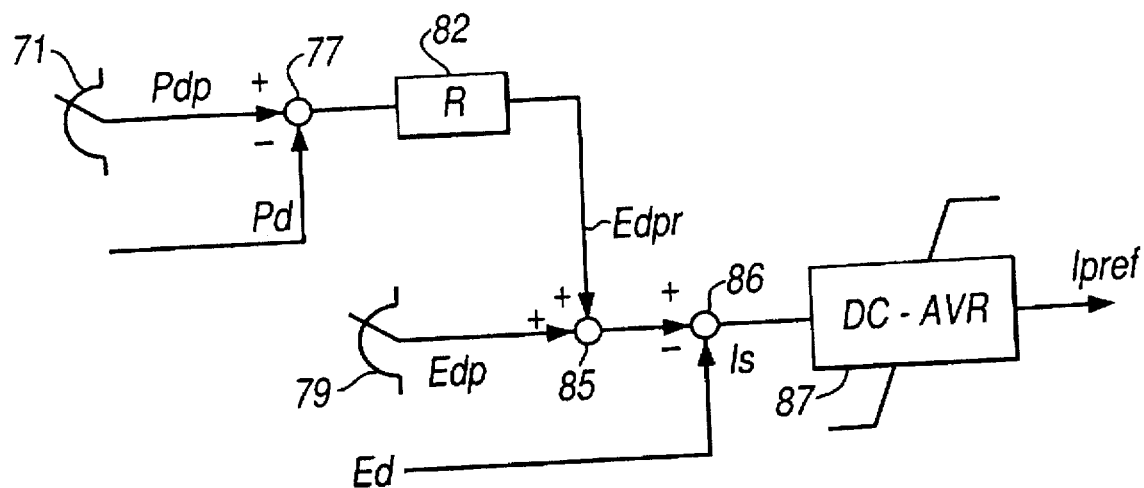
FIG. 1 is a block diagram showing a main part of a control system for a power conversion system according to a first embodiment of this invention.

Referring now to the drawings, wherein like reference numerals designate identical or corresponding parts throughout the several views, the embodiments of this invention will be described below.

FIG. 1 is a block diagram showing a main part of a control system for a power conversion system according to a first embodiment of this invention.

Figure 20:
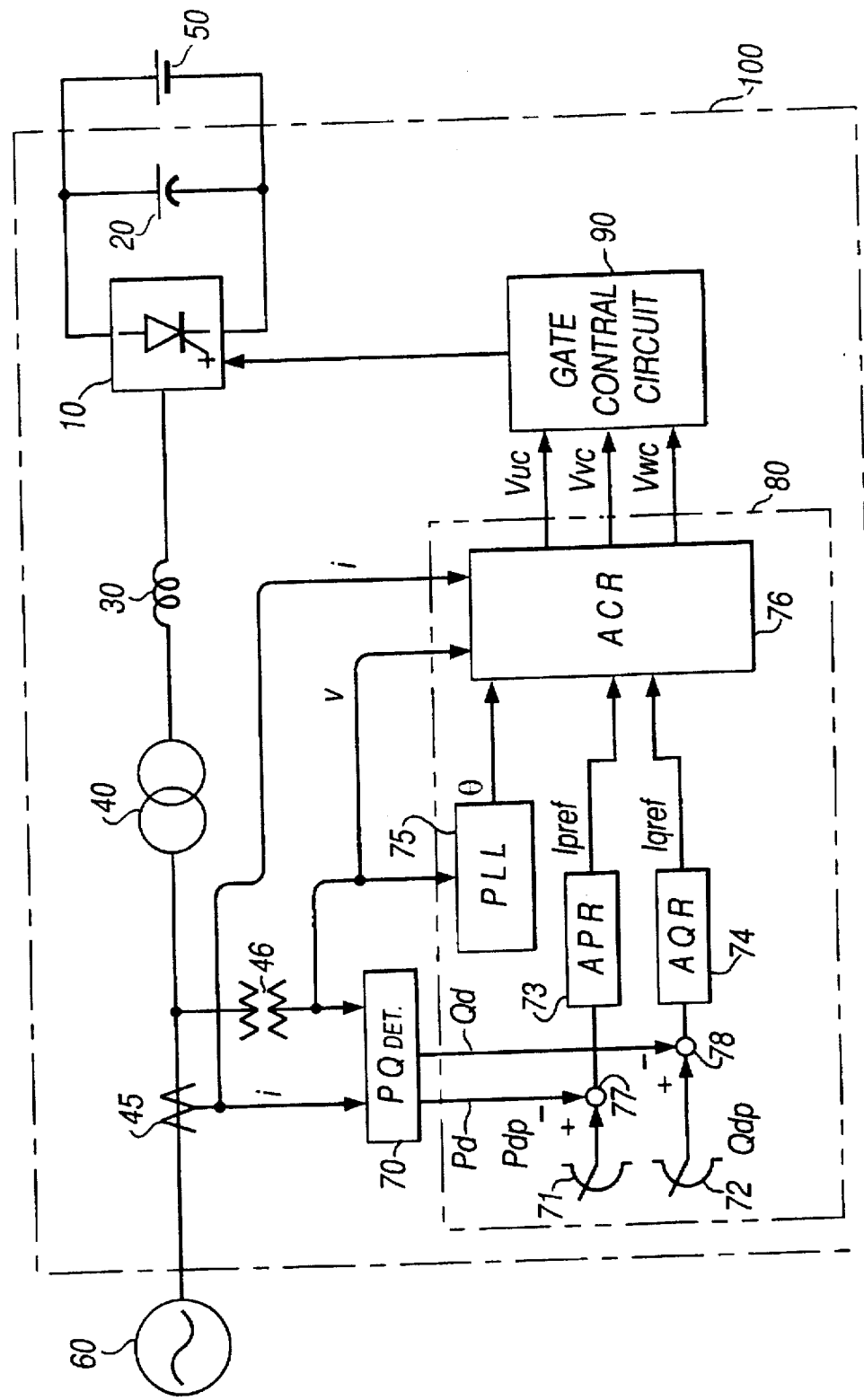
FIG. 20 is a block diagram showing one example of a conventional control system for a power conversion system.

In FIG. 1, conventional active power controller 73 which computes active current command value Ipref in a conventional control block diagram shown in FIG. 20, is replaced by an active power control system composed of an amplifier 82, DC voltage reference setter 79, an adder 85, a comparator 86 and a DC Voltage controller (DC-AVR) 87.

In FIG. 1, amplifier 82 inputs the difference obtained by comparator 77 active power reference Pdp and active power detected value Pd, and by applying a desired gain R to this difference outputs a DC voltage reference correction value Edpr. Gain R of this amplifier 82 can be set optionally.

Adder 85 adds up DC voltage reference set value Edp that is the output of DC voltage reference setter 79 and DC voltage reference correction value Edpr to obtain a corrected DC voltage reference. Comparator 86 obtains a difference between that added value (the added value of Edp and Edpr) of comparator 85 and DC voltage detected value Ed. DC voltage controller 87 inputs as an input signal Is the output of comparator 86 and outputs active current command value Ipref so as to minimize the output of comparator 86. Active current command value Ipref is applied to constant current control circuit 76 is FIG. 20.

Figure 2:
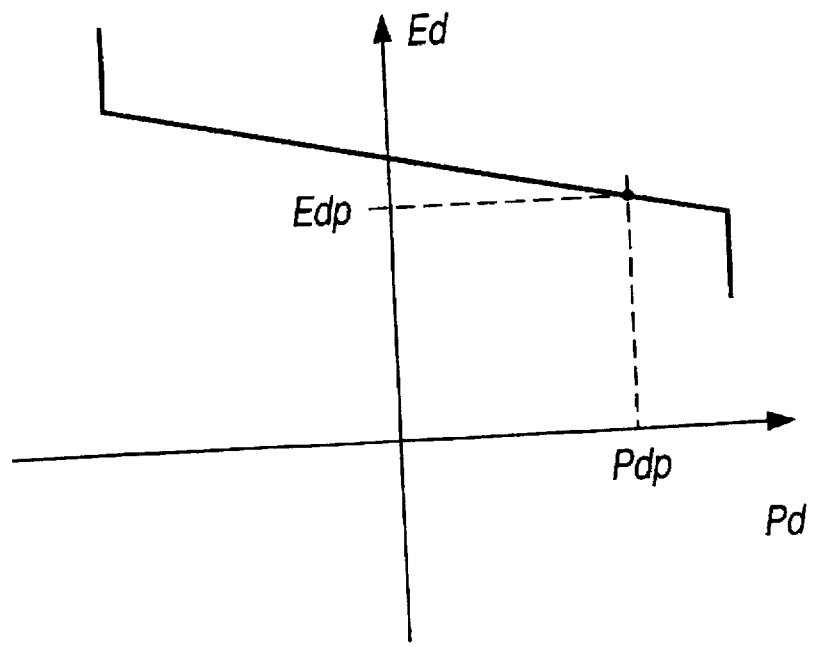
FIG. 2 is a characteristic diagram of DC voltage and active power according to the first embodiment shown in FIG. 1.

FIG. 2 shows a characteristic diagram of DC voltage Ed and active power Pd of power conversion system 100 equipped with the active power control system shown in FIG. 1. In FIG. 2, it is defined that active power detected value Pd is positive in the rectifier operation state, and is negative in the inverter operation state.

As seen from FIGS. 1 and 2, if active power detected value Pd is equal to active power reference set value Pdp, DC voltage reference correction value Edpr becomes zero, and therefore, DC voltage Ed is so controlled that it becomes equal to DC voltage reference set value Edp that is set by DC voltage reference setter 79.

If active power detected value Pd is larger than active power reference set value Pdp, DC voltage reference correction value Edpr becomes a negative value, and therefore, DC voltage Ed is so controlled that it becomes lower than DC voltage reference set value Edp.

Further, if active power detected Value Pd is smaller than active power reference set value Pdp, DC voltage reference correction value Edpr becomes a positive value, and therefore, DC voltage Ed is so controlled that it becomes higher than DC voltage reference set value Edp. A change ratio of DC voltage reference set value Edp against active power detected value Pd depends on gain R that is set in amplifier 82.

Figure 3:
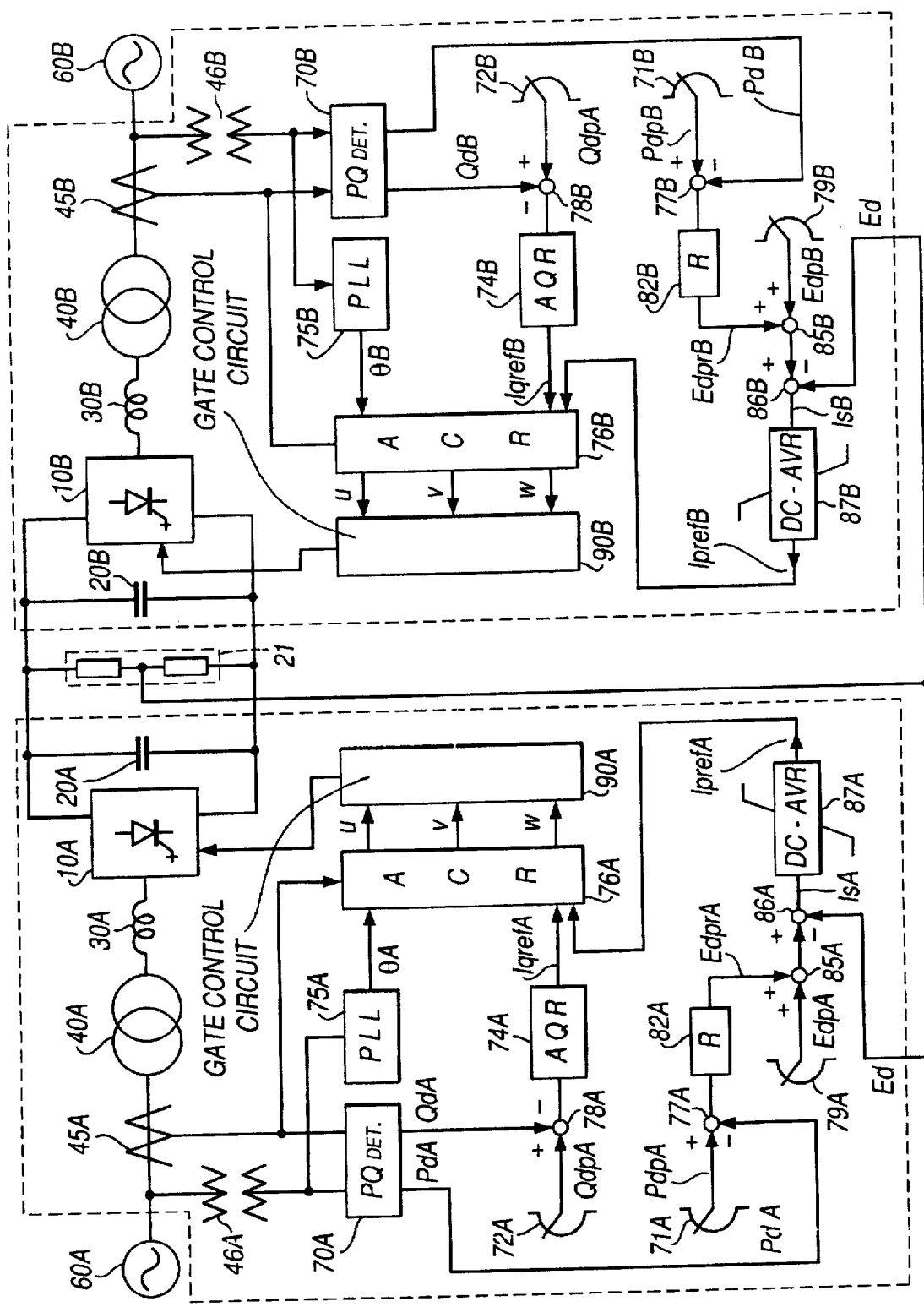
FIG. 3 is a block diagram showing a control system for a power conversion system according to a first embodiment of this invention.
Figure 21:
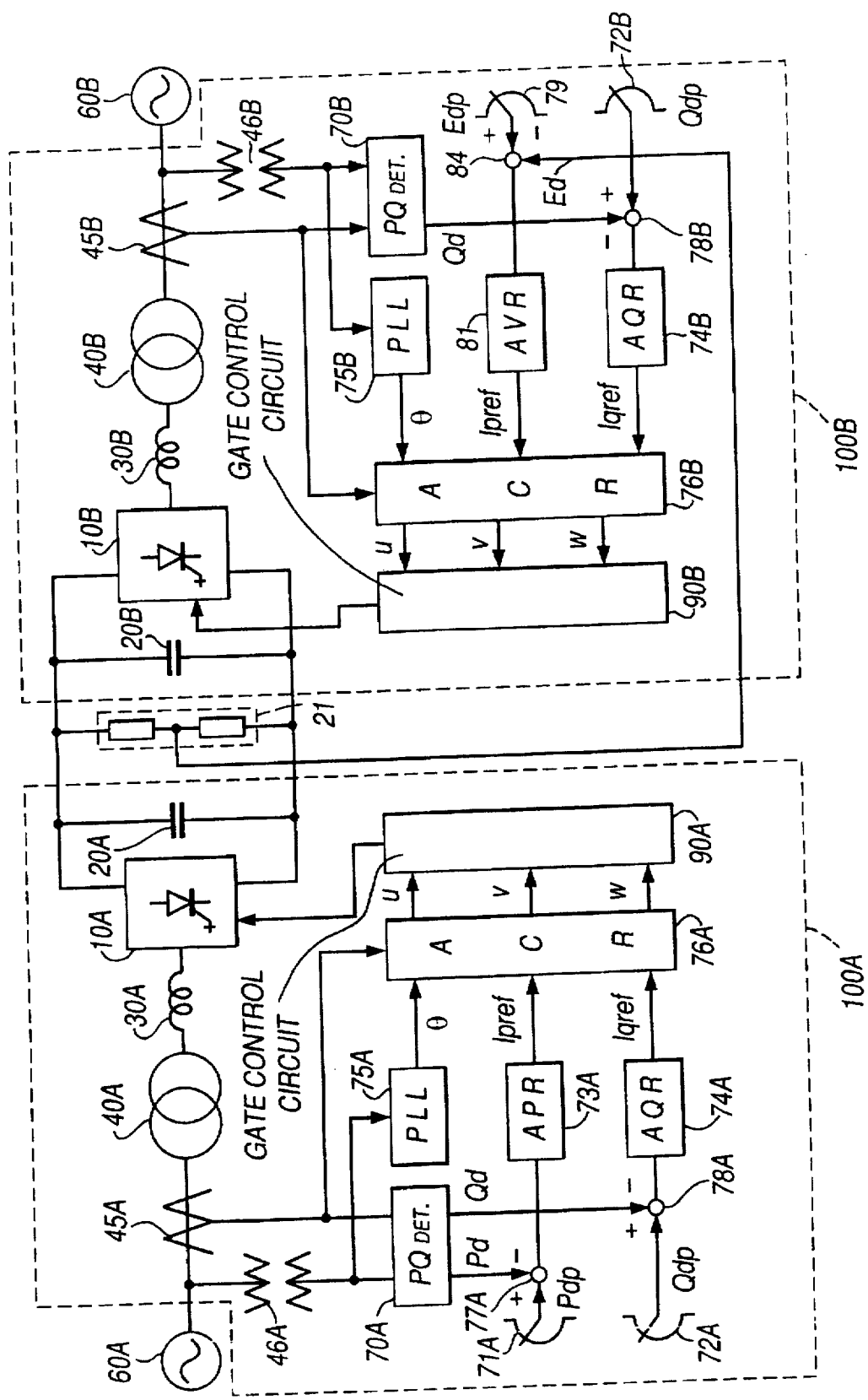
FIG. 21 is a block diagram showing another example of a conventional control system for a power conversion system.

FIG. 3 is a system block diagram showing a control system for a power conversion system in which the active power control block shown in FIG. 1 is applied to both the active current command computing circuits of power conversion systems 100A and 100B shown in FIG. 21. That is, in the power conversion system shown in FIG. 3, in power conversion system 100A (hereinafter referred to as terminal A), the active power control block shown in FIG. 1 (reference numerals are suffixed with A) is substituted for the active power control system including active power controller 73 shown in FIG. 21 and the DC voltage control system (not shown), and in power conversion system 100B (hereinafter referred as terminal B) the active power control block shown in FIG. 1 (reference numerals are suffixed with B) is substituted for the DC voltage control system including DC voltage controller 81 shown in FIG. 21 and the active power control system (not shown).

Figure 3A:
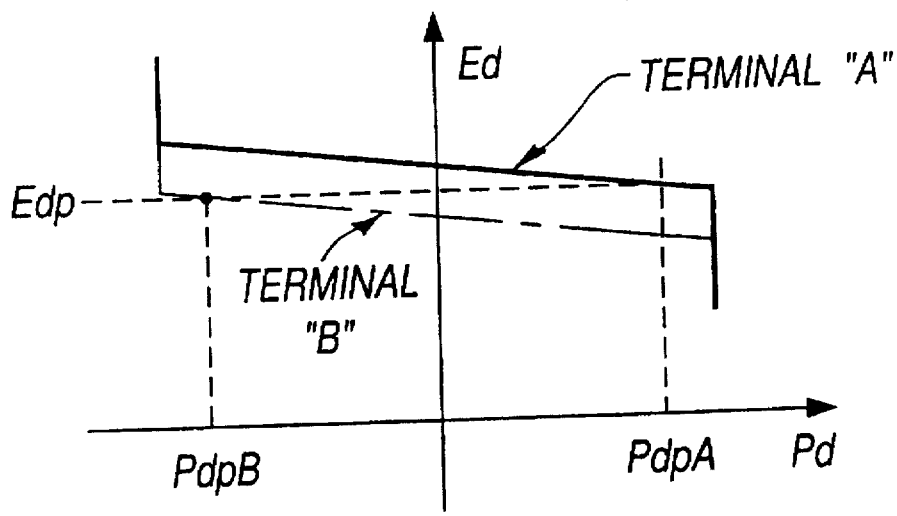
FIG. 3A is a characteristic diagram of DC voltage and active power according to the first embodiment shown in FIG. 3.

FIG. 3A shows a characteristic diagram of DC voltage Ed and active power Pd of each of power conversion systems 100A and 100B shown in FIG. 3. In FIG. 3A, an active power reference set value of terminal A is shown by PdpA and the characteristic of terminal A is shown by an solid line, and an active power reference set value of terminal B is shown by PdpB and the characteristic of terminal B is shown by an one-dot chain line. In the case that the system is composed of two power conversion systems 100A and 100B, active power reference set values PdpA and PdpB are set as PdpA=−PdpB by active power reference setter 71A and 71B. In case of the characteristic shown in FIG. 3A, the system is operated such that DC voltage is Edp, active power of terminal A is PdpA (rectifier operation) and active power of terminal B is PdpB (inverter operation).

Figure 4:
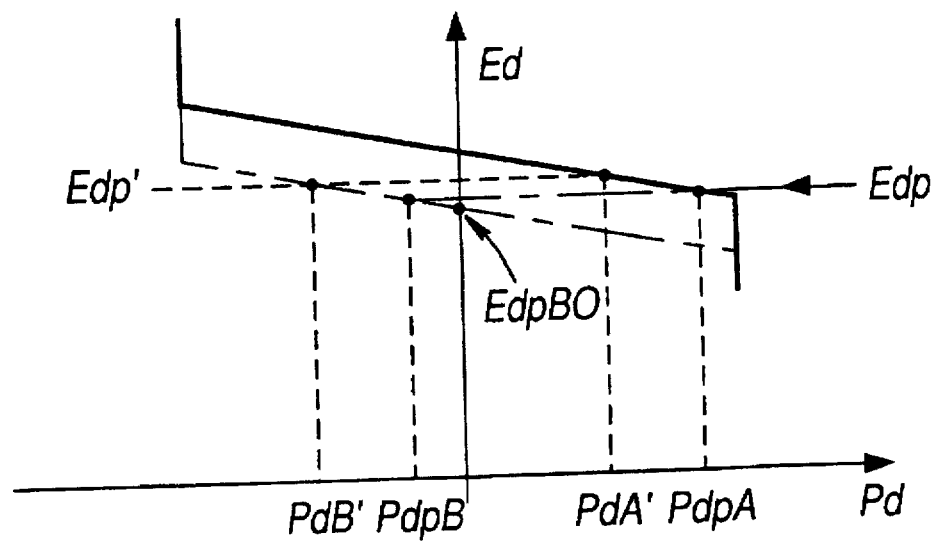
FIG. 4 is a characteristic diagram of DC voltage and active power according to the first embodiment shown in FIG. 3.

FIG. 4 shows a case where active power reference set value PdpA is not equal to active power reference set value −PdpB, that is, either active power reference set value PdpA or PdpB is erroneous. What is shown in FIG. 4 is the case where an absolute value of active power reference set value PdpA of terminal A for the rectifier operation is larger than an absolute value of active power reference set value PdpB of terminal B for the inverter operation. In this case, DC voltage Ed increases. When DC voltage Ed increases, the outputs of DC voltage controllers 87A and 87B of both terminals A and B, that is, active current command values Ipref A and Ipref B move in the direction to decrease DC voltage Ed, that is, in the negative direction. That is, active power detected values PdA and PdB also move in the negative direction, DC voltage reference correction values EdprA and EdprB of both terminals A and B become positive values and DC voltage Ed is controlled to increase. Finally, the system is operated under the condition that active power detected values PdA' and PdB' are PdA'=−PdB', and DC voltage Ep is Edp'.

Figure 5:
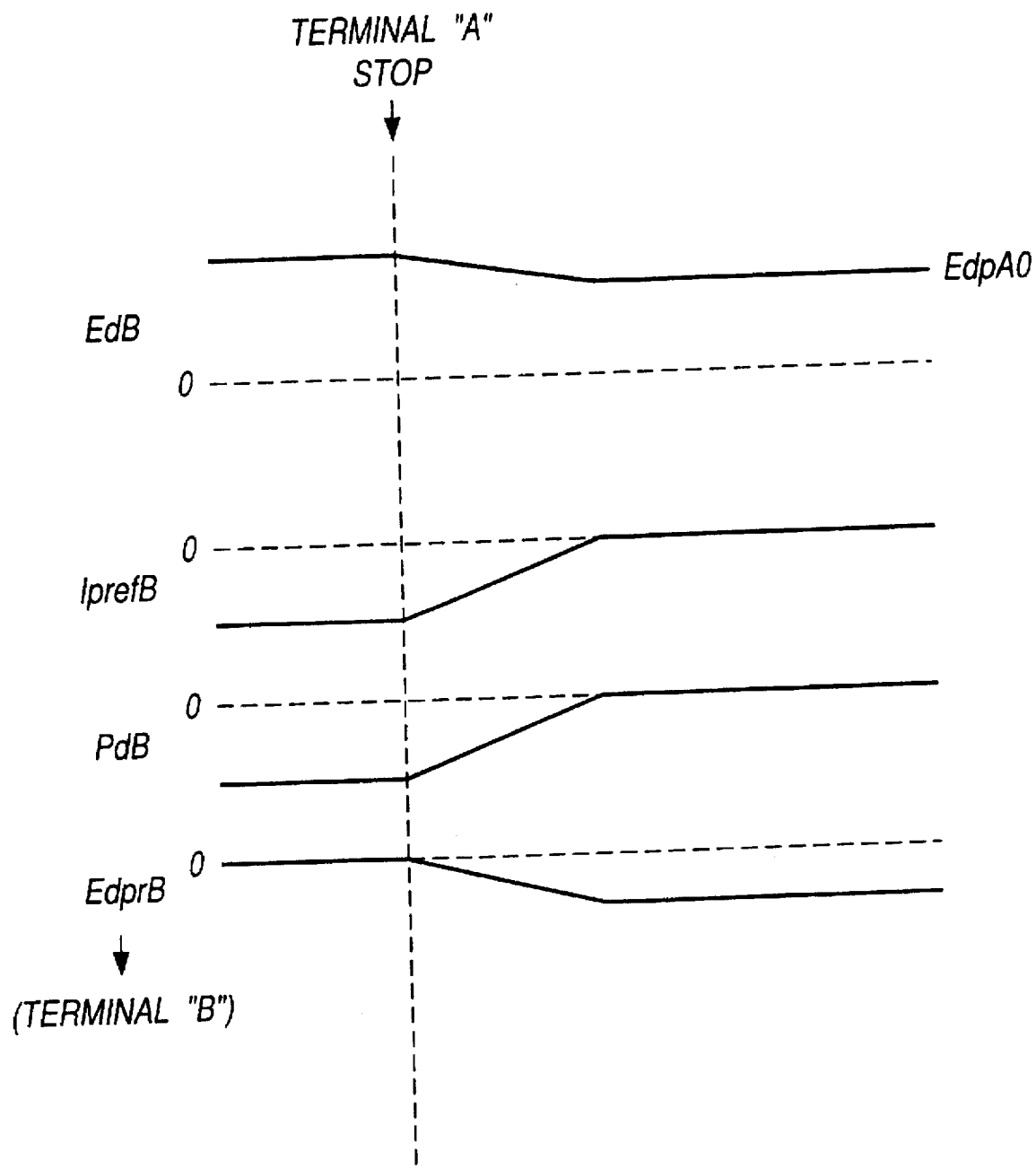
FIG. 5 is a timing chart showing the operation of a normal terminal B shown in FIG. 3.

Now, a case where terminal A stops to run for a trouble, etc. in the power conversion system shown in FIG. 3 having the characteristics shown in FIG. 3A is considered. Signals in the control block of terminal B shown in FIG. 3 at this time are shown in FIG. 5. If terminal A in the rectifier operation stops to run, DC voltage drops and DC voltage detected value Ed drops. Then, the input to DC voltage controller 87B becomes a positive value and active current command value IprefB that has been a negative value because of the inverter operation of terminal B changes in the direction going close to zero. Then, active power detected value PdB also closes to zero. If active power detected value PdB changes in the direction going close to zero, as a negative value is set for effective power reference PdpB by active power reference setter 71B, the input to amplifier 82B and DC voltage reference correction value EpdrB become negative values and thereby to correct DC voltage reference Edp in the direction to lower it. Finally, the power conversion system operates at a point where active power Pd is zero and DC voltage Ed is EdpB0 in the characteristic diagram of terminal B shown in FIG. 4.

Figure 6:
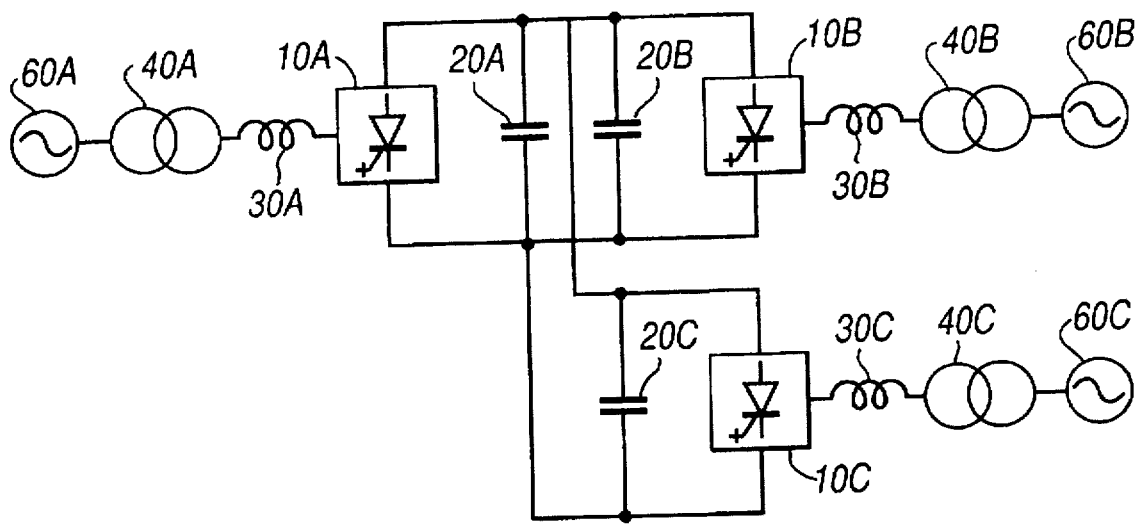
FIG. 6 is a schematic block diagram showing one example of a power conversion system composed of three power converters to which this invention is applied.
Figure 7:
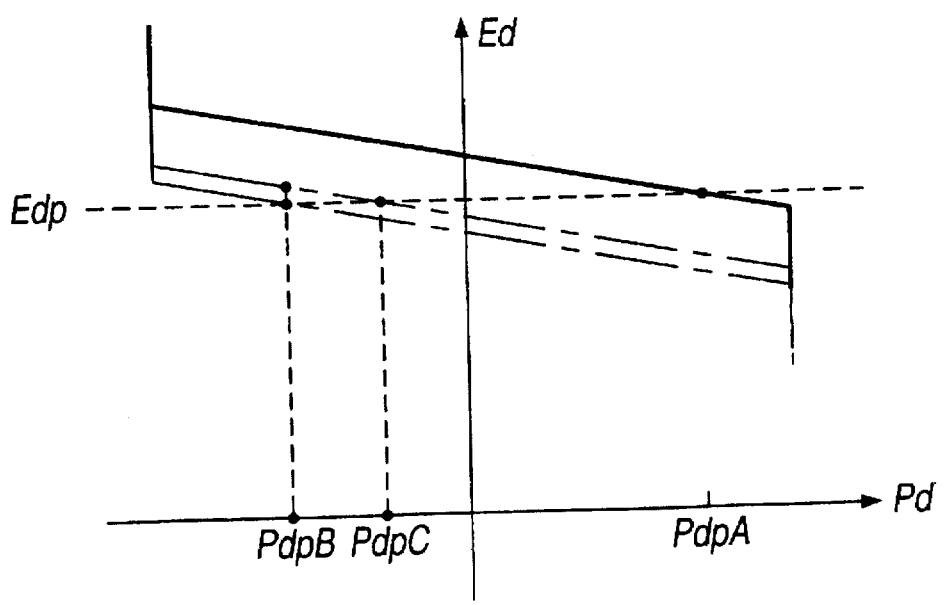
FIG. 7 is a characteristic diagram of DC voltage and active power in the power conversion system shown in FIG. 6 to which the first embodiment is applied.

Next, a power conversion system shown in FIG. 6 with the DC sides of more than 3 power converters connected is considered. In this figure, the same reference numerals suffixed with A, B or C are assigned to the elements already explained and the explanation thereof is omitted. Furthermore, for each of power converters 10A, 10B and 10C, one of the control systems shown in FIG. 3A is provided with one of suffixes A, B and C respectively. When the power conversion system is constructed as shown in FIG. 6, active power can be interchanged among AC systems 60A, 60B and 60C. FIG. 7 shows characteristics of DC voltage Ed and active power Pd when the construction shown in FIG. 1 is applied to an active power control system in the power conversion system of a 3 terminal system shown in FIG. 6. FIG. 7 shows a case where power converter 10A (hereinafter referred to as terminal A) is in the rectifier operation, and power converter 10B (hereinafter referred to as terminal B) and power converter 10C (hereinafter referred to as terminal C) are in the inverter operation. Active power reference set values PdpA, PdpB and PdpC of terminals A, B and C, are respectively, so set that the sum of them will become zero. All terminals A, B and C operate the condition that DC voltage Ed is Edp and active power PdA, PdB and PdC are active power reference set values PdpA, PdpB and PdpC given to respective terminals A, B and C, respectively.

Figure 8:
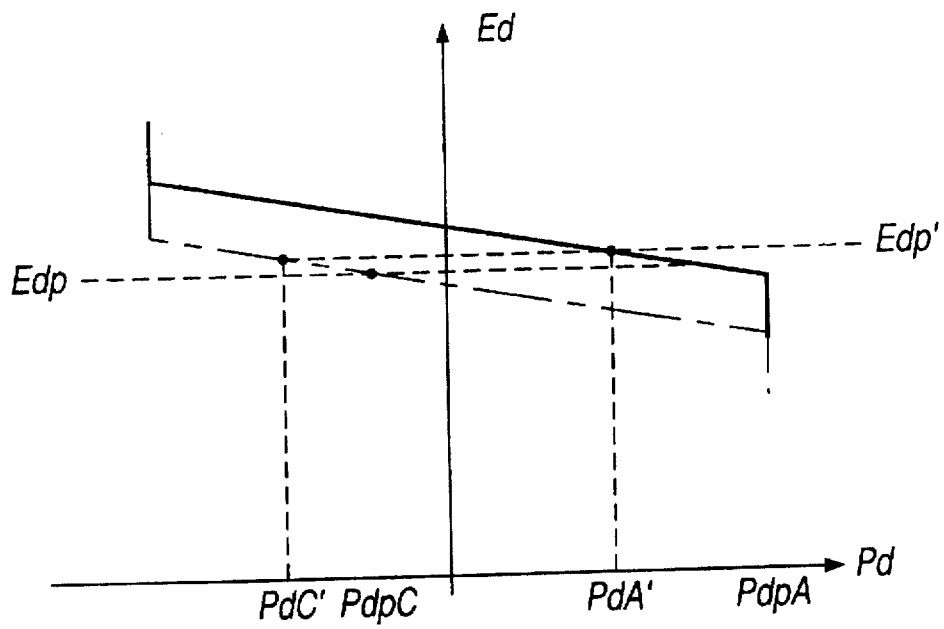
FIG. 8 is a characteristic diagram of DC voltage and active power in the power conversion system shown in FIG. 6 to which the first embodiment is applied.

FIG. 8 shows the characteristics of DC voltage Ed and active power Pd of power conversion system shown in FIG. 6 in the case when it is operated with the characteristics shown in FIG. 7 and terminal B fails to run for a trouble, etc. As terminal B stops while performing the inverter operation, DC voltage Ed increases. The outputs of DC voltage controllers 87A and 87C of the normal terminals A and C, that is, active current Command values IprefA and IprefC change in the negative direction. Pursuant to it, active power detected values PdA and PdC change in the negative direction. DC voltage reference correction value EdprA and EdprC become positive values and DC voltage Ed is controlled to increase. Finally, the system is operated under the condition that active power detected values PdA and PdC' are PdA'=-PdC' and DC voltage Ed is Edp'.

FIG. 8 is explained using 3 terminal system shown in FIG. 6. It is, however, clear that in power conversion system composed of more than 3 terminals, DC voltage reference of each terminal is corrected so that the sum of active powers of remaining normal terminals becomes zero and the operation can be continued. Further, the power conversion system according to the first embodiment of self-commutated type.

However, it is clear that the same effect can be obtained in an externally commutated power conversion system if the relationship between active power Pd and DC voltage Ed is as shown by the characteristics in FIGS. 7 and 8.

Figure 9:
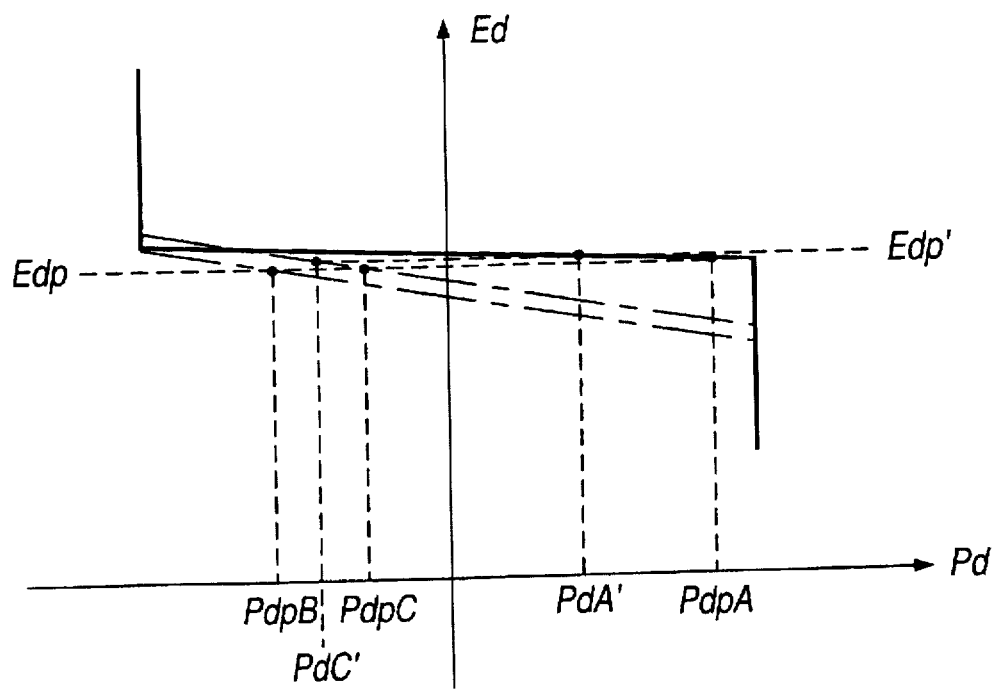
FIG. 9 is a characteristic diagram of DC voltage and active power in the power conversion system shown in FIG. 6 to which the first embodiment is applied.

FIG. 9 shows a characteristics diagram of DC voltage Ed and active power Pd when the gain of amplifier 82A of the active power control system of terminal A is made ⅓ of the gain of amplifiers 82B and 82C of terminals B and C in the system shown in FIG. 6. Now, a case where terminal B stops when operating at the characteristics shown in FIG. 9 is considered. Likewise FIG. 8, the system is operated under the condition that active power detected values PdA and PdC of terminals A and C are PdA'=-PdC', and DC voltage Ed is Edp'. A point differing from FIG. 8 is that the change in active powers PdpA~PdA' at terminal A before and after terminal B stops is larger at terminal A of which gain is set at ⅓ of that of terminal C than the change in active powers PdpC~PdpC' at terminal C. The gain set by amplifier 82 is equivalent to a change ratio of DC voltage reference Edp against active power Pd in the characteristics of the power conversion system. Accordingly, the less a set value for the gain is, the more active power Pd is required for changing DC voltage Ed. In the characteristic diagram shown in FIG. 9, as the gain set by amplifier 82A of terminal A is made smaller, change in active power PdA of terminal A becomes larger. As shown in FIG. 9, it is possible to change a sharing ratio of each terminal A, B or C during the power fluctuation by changing a value of the gain of amplifiers 82A, 82B and 82C. For instance, in case of the characteristics shown in FIG. 9, it is better to connect terminal A to a relatively strong system and terminal C to a relatively weak system.

As explained above, in a power conversion system composed of a plurality of power converters with their DC sides connected for converting AC power to DC power or vice versa and for exchanging power between AC power systems and a DC line, when each of the power converters computes a difference between a reference value and a detected value of an active power that is exchanged by the power converter with the AC power system and corrects a DC voltage reference value of the power converter in proportion to the computed difference, an inclination is generated in the characteristic of the active power and the DC voltage. For instance, if active power of power converters in the rectifier operation is determined to be positive, when a difference is computed by subtracting an active power detected value from an active power reference, a DC voltage reference is corrected by adding a value proportional to the difference, and the power converter is controlled so as to bring the difference between the corrected DC voltage reference and a DC voltage detected value close to zero, the characteristic that DC voltage drops with the increase of active power is obtained. If each of power converters has the characteristic described above, a power conversion system operates during the normal operation at a point where the sum of active powers of all power converters becomes zero and DC voltages of the power converters become equal to each other. Even when any accident occurs and one power converter stops to run, the operation of the system can be continued at a point where the sum of active powers of remaining power converters becomes zero and DC voltages of all the power converters become equal to each other.

Further, the stabilized operation is possible even when an active power reference is erroneously set and the sum of active power set values as a system is not zero. Furthermore, it is possible to change a sharing ratio of power fluctuation for each power converter by changing a correction factor for DC voltage for each power converter thereby to control the power converters according to characteristics of AC power systems to which the power converters are connected.

Figure 10:
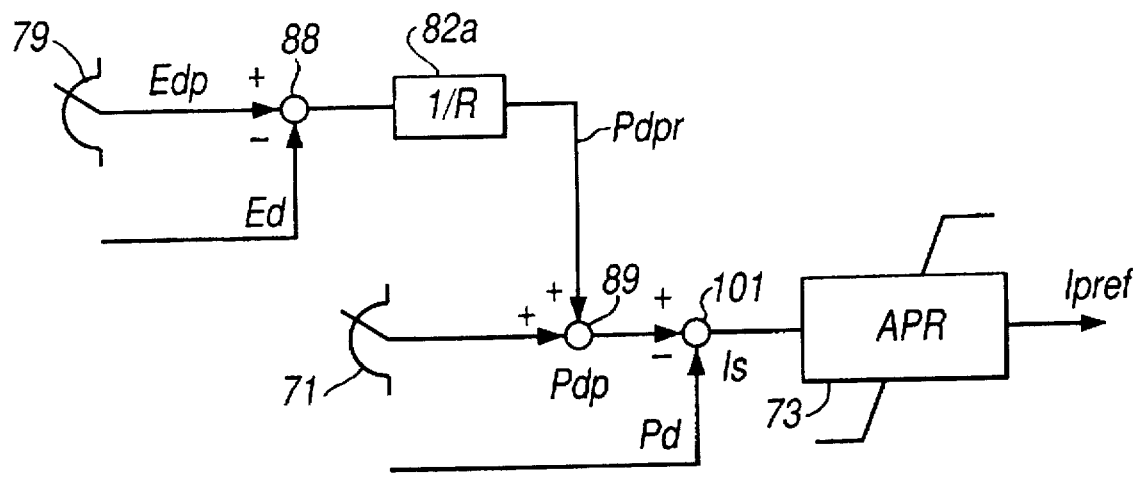
FIG. 10 is a block diagram showing a main part of a control system for a power conversion system according to a second embodiment of this invention.

With reference to FIG. 10, a control system for a power conversion system according to a second embodiment of this invention is described. In this embodiment, the control block shown in FIG. 1 is substituted by that shown in FIG. 10. In FIG. 10, the control block is composed of active power reference setter 71, DC voltage reference setter 79, an amplifier 82′a[], active power controller 73, comparators 88, 101 and an adder 89. This system is different in circuit construction from that shown in FIG. 1 but the functions are the same.

Comparator 88 computes a difference between DC voltage reference set value Edp set by DC voltage reference setter 79 and DC voltage detected value Ed. Amplifier 82a divides the output (the difference between Edp and Ed) of comparator 88 by a gain R and outputs it as an active power correction value Pdpr. Adder 89 adds up active power reference Pdp from active power reference setter 71 and output Pdpr of amplifier 82a to obtain a corrected active power reference. Comparator 101 computes a difference between output Pdpr of adder 89 and active power detected value Pd and outputs the difference as an input signal Is to active power controller 73. Active power controller 73 inputs input signal Is and outputs active current command value Ipref so as to minimize input signal Is.

In the circuit shown in FIG. 10, input signal Is to active power controller 73 is shown by Equation (1).

Input signal Is=(DC voltage reference Edp−DC voltage detected value Ed)/(gain R)+(Active power reference Pdp−Active power detected value Pd)  (1)

When both sides of Equation (1) are multiplied by gain R, Equation (2) is obtained.

Input signal Is×gain R=(DC voltage reference Edp−DC voltage detected value Ed)+(Active power reference Pdp−Active power detected value Pd)×gain R  (2)

The right side of Equation (2) is the same as the equation for input of DC voltage controller 87 in the control block diagram shown in FIG. 1.

Therefore, even when such a control block diagram as shown in FIG. 10 is used, the same action and effect as the first embodiment described above is obtained. That is, for instance, if active power in the rectifier operation of each power converter is determined to be positive, when a difference is computed by subtracting DC voltage detected value from DC voltage reference, active power reference is corrected by adding a value proportional to the computed difference, and a difference between the corrected active power reference and active power detected value is so controlled as to bring it close to zero, a characteristic that DC voltage drops with the increase of active power is obtained. If all the power converters have this characteristic, respectively, the system operates such that the sum of active power of all the power converters becomes zero and DC voltage of the power converters become equal to each other during the normal operation. Even when one power converter stops to run for a trouble, the power conversion system is able to continue the operation at a point where the sum of active powers of the remaining power converters becomes zero and DC voltages of all the remaining power converters become equal to each other.

Figure 11:
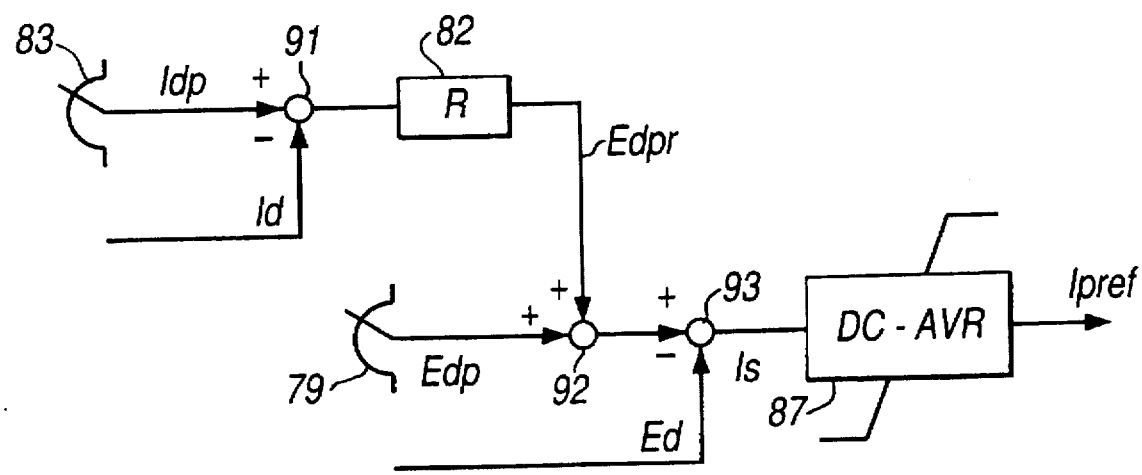
FIG. 11 is a block diagram showing a main part of a control system for a power conversion system according to a third embodiment of this invention.

With reference to FIG. 11, a control system for a power conversion system according to a third embodiment of this invention is described. In this embodiment, the control block shown in FIG. 1 is substituted by that shown in FIG. 11. In FIG. 11, the control block is composed of a DC current reference setter 83, amplifier 82, DC voltage reference setter 79, DC voltage controller 87, comparators 91, 93 and an adder 92.

In the power conversion system shown in FIG. 3, a DC current Id flowing between DC side of each of power converters 10A and 10B and DC line is detected by a DC current detector (not shown). Comparator 91 computes a difference between a DC current reference set value Idp from DC current reference setter 83 and DC current detected value Id. Amplifier 82 multiplies the output of comparator 91 by gain R and outputs it as DC voltage reference correction value Edpr. Adder 92 adds up DC voltage reference set value Edp from DC voltage reference setter 79 and output Edpr of amplifier 82 to obtain a corrected DC voltage reference. Comparator 93 computes a difference between the output of adder 92 and DC voltage detected value Ed. DC voltage controller 87 inputs the output of comparator 93 as input signal Is and outputs active current command value Ipref so as to minimize input signal Is.

According to the third embodiment described above, the following actions and effects are obtained. That is, for instance, if DC power of each power converter in the rectifier operation is determined to be positive, when a difference is computed by subtracting DC current detected value from DC current reference, DC voltage reference is corrected by adding a value proportional to the computed difference, and a difference between the corrected DC voltage reference and DC voltage detected value is so controlled as to bring it close to zero, a characteristic that DC voltage drops with the increase of DC current is obtained. If all the power converters have such a characteristic as described above, the power conversion system operates during the normal operation at a point where the sum of output DC currents of all power converters becomes zero and DC voltages of all power converters becomes zero and DC voltages Of all power converters become equal to each other. Even when one power converter stops to run for a trouble, the power conversion system is able to continue the operation at a point where the sum of the output DC currents of remaining power converters becomes zero and DC voltages of the power converters become equal to each other. In addition, this embodiment has such a further merit that it is easy to protect equipments in the power conversion system from DC overcurrent, as there is no fluctuation Of DC current resulting from the fluctuation of DC voltage by controlling DC current rather than by controlling active power (a value of DC voltage multiplied by DC current).

In FIG. 11, DC voltage reference is corrected using DC current instead of active power in FIG. 1. If fluctuation of DC voltage is less, DC current becomes a value nearly proportional to active power, and electric power can be interchanged among AC power systems with power converters connected. Likewise the first embodiment, even when more than one power converter stops to run, it is clear that the operation can be continued by remaining normal power converters.

Figure 12:
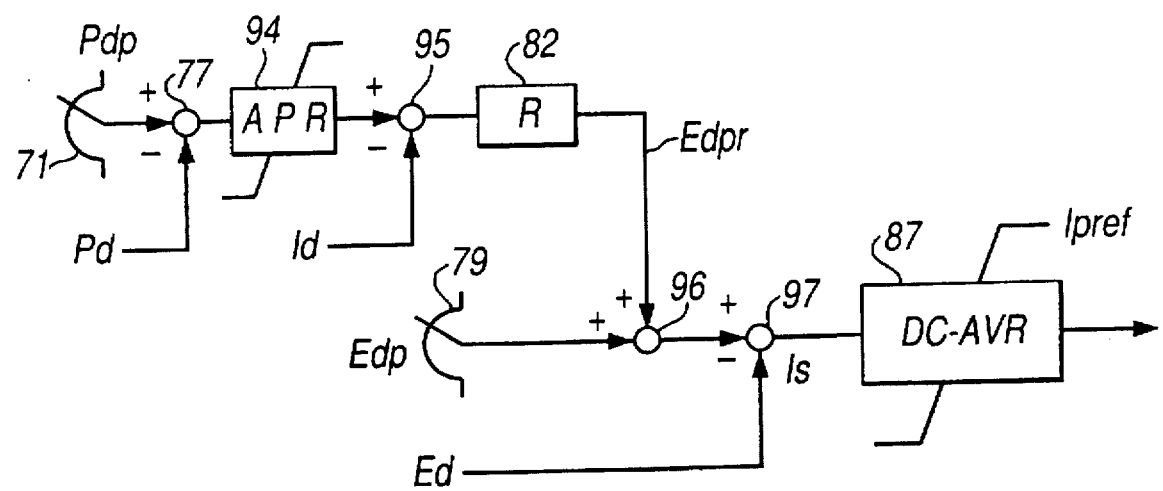
FIG. 12 is a block diagram showing a main part of a control system for a power conversion system according to a fourth embodiment of this invention.

With reference to FIG. 12, a control system for a power conversion system according to a fourth embodiment of this invention is described. In this embodiment, the control block shown in FIG. 11 is substituted by that shown in FIG. 12.

As shown in FIG. 12, in this embodiment DC current reference Idp shown in FIG. 11 is replaced by the output of an active power controller 94. The control block according to this embodiment is composed of active power reference setter 71, active power controller 94, DC reference voltage setter 79, amplifier 82, DC voltage controller 87, comparators 77, 95, 97 and an adder 96.

Comparator 77 computes a difference between active power reference set value Pdp from active power reference setter 71 and active power detected value Pd. Active power controller 94 acts to make the difference small between Pdp and Pd, which is the output of comparator 77. Comparator 95 obtains a difference between the output of active power controller 94 and DC current detected value Id. Amplifier 82 outputs a value of the output of comparator 95 multiplied by a gain as DC voltage reference correction value Edpr. Adder 96 adds up output Edpr of amplifier 82 and DC voltage reference Edp and outputs it as a corrected DC voltage reference. Comparator 97 obtains a difference between the corrected DC voltage reference from adder 96 and DC voltage detected value Ed. DC voltage controller 87 outputs active current command value Ipref so as to bring output Is of comparator 97 which is the difference between corrected DC voltage reference and DC voltage detected value Ed close to zero.

According to the fourth embodiment described above, the following actions and effects are obtained. That is, for instance, DC power of all the power converters in the rectifier operation is determined to be positive, when the system is controlled such that a difference is computed by subtracting DC current detected value from the output of active power controller DC voltage reference is corrected by adding a value proportional to the computed difference and the difference between the corrected DC voltage reference and DC voltage detected value is so controlled as to bring it close to zero, a characteristic that DC voltage drops with the increase of DC current is obtained. If all the power converters have such the characteristic, the power conversion system operates at a point where the sum of output DC currents of all the power converters becomes zero and DC voltages of all the power converters become equal to each other in the normal operation. Even when one power converter stops to run, the power conversion system is able to continue the operation at a point where the sum of output DC currents of remaining power converters becomes zero and DC voltages of all the remaining power converters become equal to each other. Further, it is designed such that a difference between the output of active power controller and DC current is taken. Accordingly, even when a deviation is produced in active power, the output of active power controller changes, and a value equivalent to DC current reference changes, and it is so corrected that active power is not changed even when DC voltage and so on are fluctuated, and active power can be maintained at a constant level.

Figure 13:
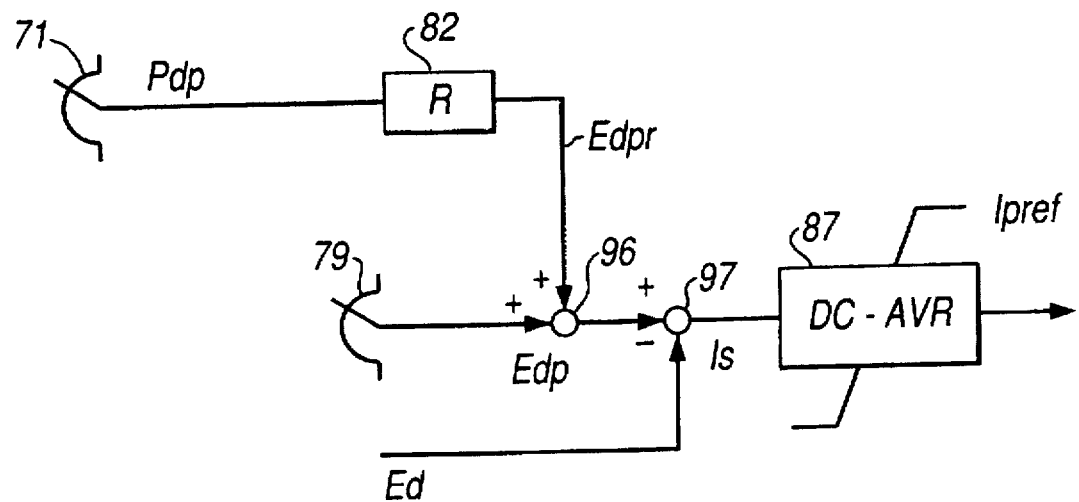
FIG. 13 is a block diagram showing a main part of a control system for a power conversion system according to fifth embodiment of this invention.

With reference to FIG. 13, a control system for a power conversion System according to a fifth embodiment of this invention is described in this embodiment, the control block shown in FIG. 1 is substituted by that shown in FIG. 13.

As shown in FIG. 13, what is differing from the embodiment shown in FIG. 1 is that only active power reference Pdp is used for correcting DC voltage Edp without using a difference between active power reference Pdp and active power detected value Pd. The control block according to this embodiment is composed of active power reference setter 71, amplifier 82, DC reference voltage setter 79, DC voltage controller 87, adder 96 and comparator 97.

Active power reference setter 71 outputs active power reference set value Pdp, and amplifier 82 amplifies this output by gain R and outputs it as DC voltage reference correction value Edpr. Adder 96 adds up DC reference voltage set value Edp from DC reference voltage setter 79 and output Edpr of amplifier 82 and outputs it as corrected DC Voltage reference. Comparator 97 obtains a difference between the corrected DC voltage reference, that is the output of adder 96, and DC voltage detected value Ed, and outputs it as input signal Is to DC voltage controller 87. DC voltage controller 87 outputs active current command value Ipref so that input signal Is which is the difference between corrected DC voltage reference and DC voltage detected value Ed is brought close to zero. Here, input signal Is to DC voltage controller 87 is shown by Equation (3) as described below.

Input signal Is=(active power reference value Pdp×gain R+DC voltage reference value Edp)−DC voltage detected value Ed (3)

According to the fifth embodiment as described above, the following actions and effects are obtained. That is, for instance, if active power of the power converter in the rectifier operation is determined to be positive, when DC voltage reference is corrected by adding a value proportional to the active power reference, and a difference between the corrected DC voltage reference and DC voltage detected value is so controlled as to bring it close to zero, a characteristic that DC voltage drops with the increase of active power is obtained. If all the power converters have such the characteristic and DC voltage reference is set properly, the power conversion system operates at a point where the sum of active powers of all the power converters becomes zero and DC voltages of all the power converters become equal to each other in the normal operation. Even when one power converter stops to run for a trouble, the power conversion system is able to continue the operation at a point where the sum of active powers of the remaining power converters becomes zero and DC voltage of the remaining power converters becomes equal to each other. In this system, as DC voltage reference is corrected by active power reference value only, there is no longer interference between a control system to correct DC voltage reference by active power detected value and a DC voltage control system and thus, the power conversion system can be controlled by a simple circuit.

Figure 14:
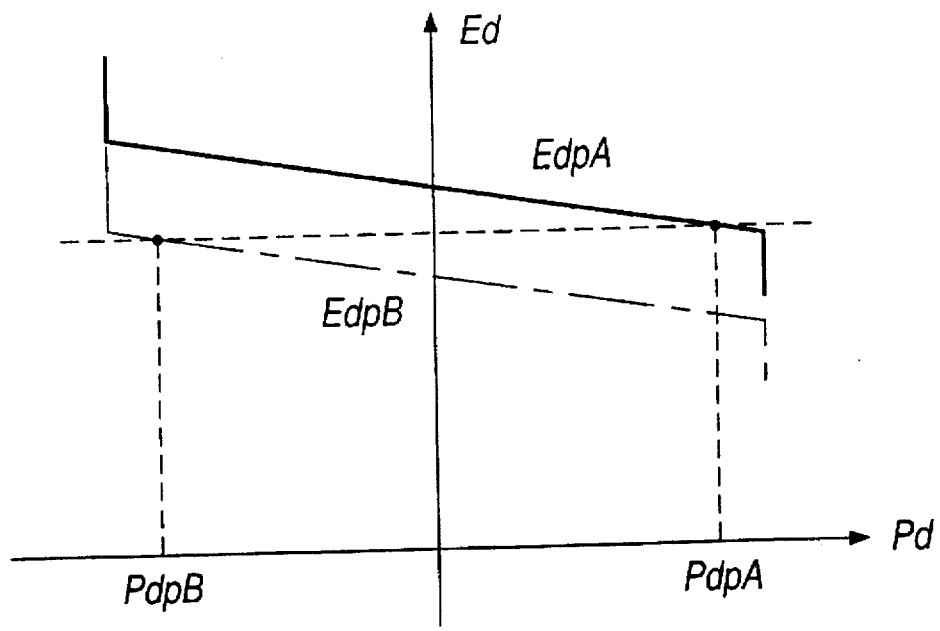
FIG. 14 is a characteristic diagram of DC voltage and active power according to the fifth embodiment shown in FIG. 13.

FIG. 14 shows a characteristic diagram of active power Pd and DC voltage Ed in a power conversion system composed of two power converters 10A, 10B having such construction as shown in FIG. 13 by connecting their DC sides.

As shown in FIG. 14, when DC voltage reference EdpA of power converter 10A which performs the rectifier operation is set high, DC voltage reference EdpB of power converter 10B which performs the inverter operation is set low, and the gains of amplifiers 82A and 82B are set at proper values, active power exchanged between two power converters is controlled.

In this embodiment, as no correction is made by an active power detected value, there is such a merit that the control system becomes simple and it becomes unnecessary to examine interference between DC voltage control system and a control system to correct DC voltage reference by active power detected value.

Figure 15:
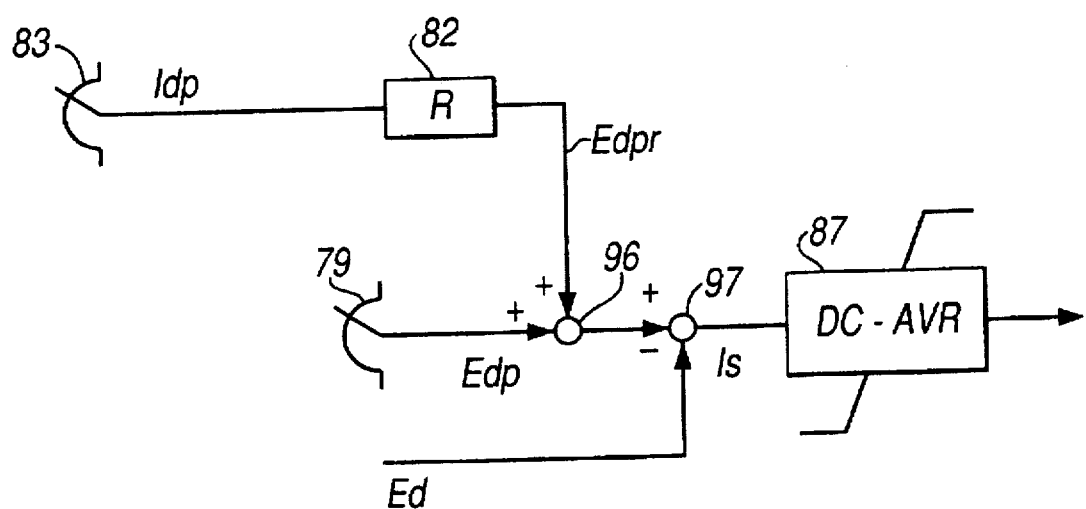
FIG. 15 is a block diagram showing a main part of a control system for a power conversion system according to a modification of the fifth embodiment of this invention.

FIG. 15 shows a modification of the fifth embodiment of the present invention shown in FIG. 13. This modification is different from FIG. 13 only in that DC voltage reference Edp is corrected using a DC current reference set value Idp from DC current reference setter 83 instead of an active power set value Pdp from active power reference setter 71. Specifically, DC current reference set value Idp is multiplied by gain R in amplifier 82 to obtain DC voltage reference correction value Edpr, which is applied to adder 96 to correct DC voltage reference value Edp.

Generally, active power is a Value obtained by multiplying DC voltage by DC current. If DC voltage fluctuates less, DC current becomes a value nearly proportional to active power and the same action and effect as in FIG. 13 is obtained.

Figure 16:
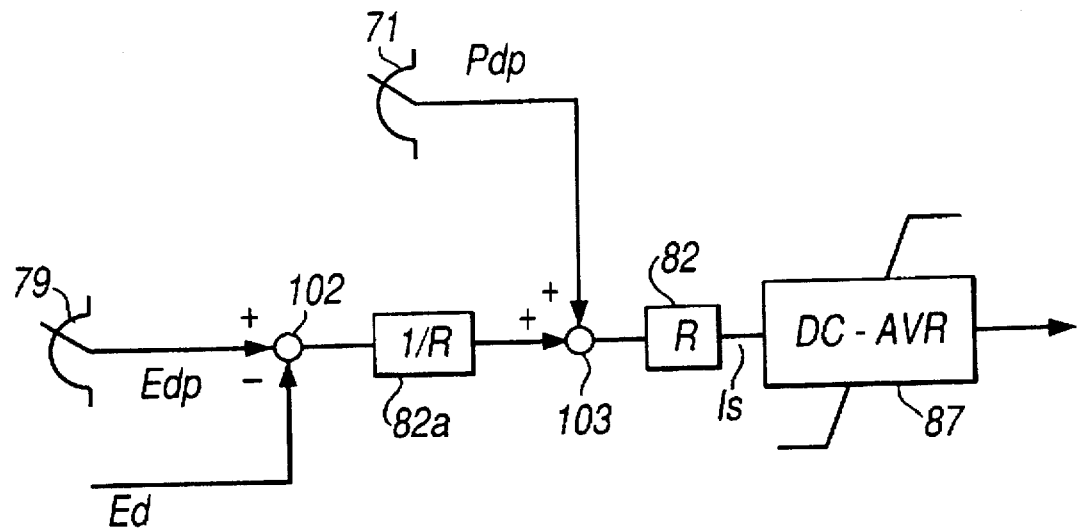
FIG. 16 is a block diagram showing a main part of a control system for a power conversion system according to another modification of the fifth embodiment of this invention.

FIG. 16 is another modification of the fifth embodiment of the present invention shown in FIG. 13. In FIG. 16, input signal Is to DC voltage controller 87 is shown by Equation (4) described below.

Input signal Is=(DC voltage reference Edp−DC voltage detected value Ed)+Active power reference Pdp×gain R  (4)

This equation (4) is the same as equation (3) of input signal Is to DC voltage controller 87 in the control block diagram shown in FIG. 13. Therefore, the same action and effect are obtained when using such a control block diagram as shown in FIG. 16.

Figure 17:
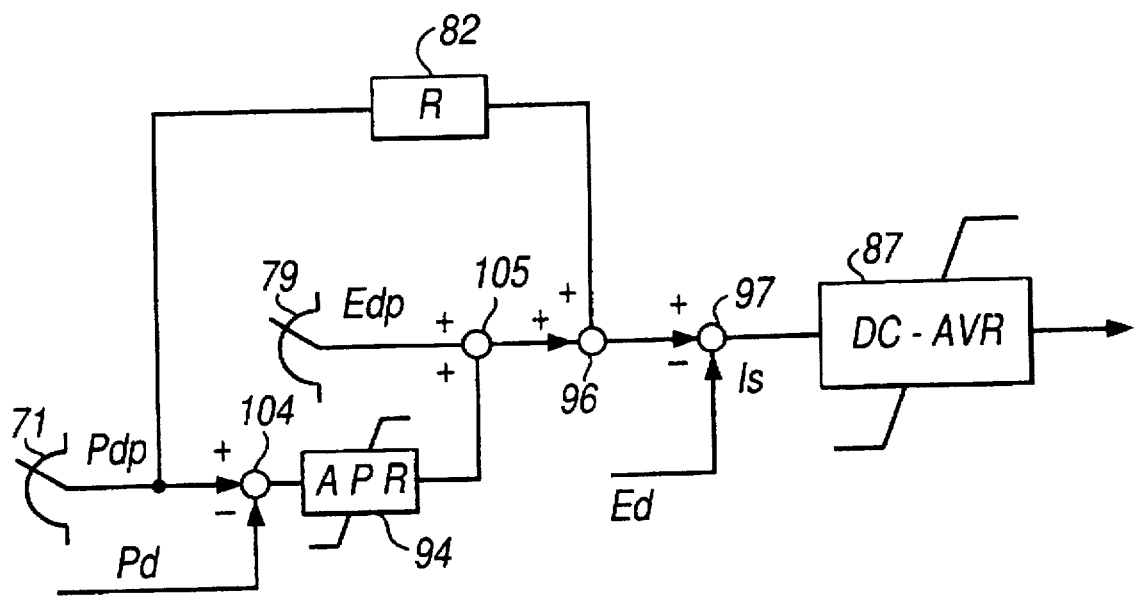
FIG. 17 is a block diagram showing a main part of a control system for a power conversion system according to a sixth embodiment of this invention.
Figure 18:
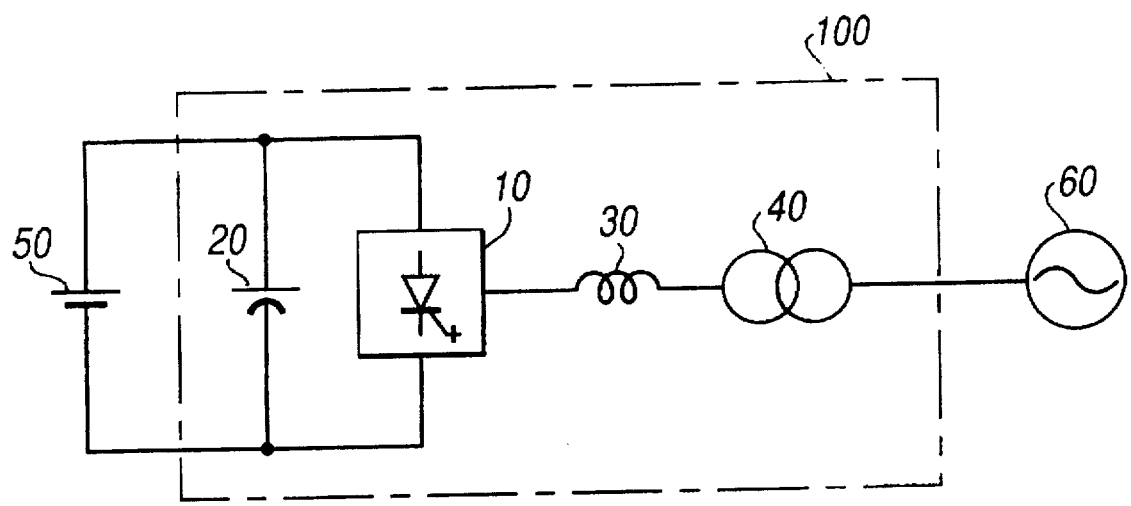
FIG. 18 is a schematic block diagram showing one example of a main circuit of a conventional voltage source type self-commutated power conversion system.
Figure 19:
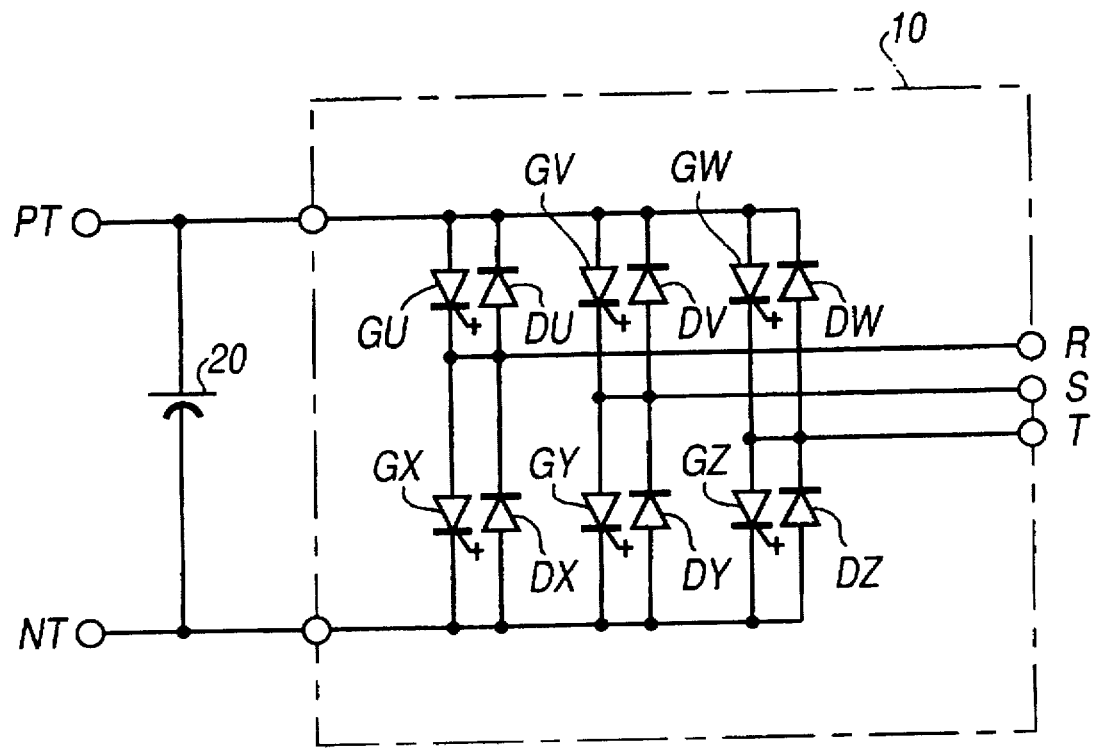
FIG. 19 is a circuit diagram showing one example of a main circuit of a power converter.

With reference to FIG. 17, a control system for a power conversion system according to a sixth embodiment of this invention is described. In this embodiment, the control block shown in FIG. 13 is substituted by that shown in FIG. 17.

As shown in FIG. 17, in this embodiment, the correction of DC voltage reference Edp by the output of active power controller 94 is added to the control block shown in FIG. 13. Definitely, this embodiment differs from the embodiment shown in FIG. 13 only in that a comparator 104 to obtain a difference between active power reference Pdp set by active power reference setter 71 and active power detected value Pd, active power controller 94 which acts to make the difference small between Pdp and Pd which is the output of comparator 104, and adder 105 which adds up DC voltage reference set value Edp from DC reference voltage setter 79 and the output of active power controller 94 so as to correct DC voltage reference Edp and outputs this added value to adder 96 shown in FIG. 13.

According to this embodiment, the following actions and effects are obtained. That is, in the embodiment shown in FIG. 13, in order to control active power of each of power converters, it is necessary to set DC voltage reference of power converter for performing the rectifier operation high, DC voltage reference of power converter for performing the inverter operation low, and the gain of amplifier 82 at a proper value. However, in the embodiment shown in FIG. 16, even when DC voltage references of power converters are the same value, DC voltage reference of each of power converters is corrected by the output of each of active power controllers 94. Accordingly, it becomes unnecessary to change DC voltage reference set value for each of power converter for the rectifier operation and power converter for the inverter operation by taking voltage drop by resistance of DC line into consideration.

According to a modification of this embodiment, the correction by amplifier 82 can be omitted. This is because it is possible to correct the correction of amplifier 82 by the output of active power controller 94.

The first through the sixth embodiments are explained in the above except the voltage drop of DC lines. However, it is apparent that the same effects can be obtained, if all the power converters are so controlled that the sum of active powers of all power converters becomes zero including loss of active powers by resistances of DC lines.

As described above, according to this invention, it is possible to provide a control system for a power conversion system composed of a plurality of power converters connected between a plurality of AC power systems and a DC line for exchanging electric power between the AC power systems and the DC line, which is capable to continue the operation of the remaining normal power converter even when one of the power converters stops to run due to a system accident or a failure of the power converter.

Obviously, numerous modifications and variations of the present invention are possible in light of he above teachings. It is therefore to be understood that within the scope of the appended claims, the invention may be practiced otherwise than as specifically described herein.

What is claimed is:

1. A control system for a power conversion system composed of a plurality of power converters, each of which is composed of a plurality of semiconductor switching devices, converts AC power into DC power or DC power into AC power, is connected between one of a plurality of AC power systems and a DC line to exchange an electric power between one of said AC power systems and said DC line, respectively, said control system being composed of a plurality of control means, each of which is provided for one of said power converters, respectively, each of said control means comprising:

means for detecting an AC current flowing between said AC power system and said power converter;

means for detecting an AC voltage of said AC power system;

means for detecting a DC voltage of said power converter;

means for detecting an active power and a reactive power exchanged between said power converter and said AC power system based on said AC current and said AC voltage;

active power control means for generating an active current command so that said DC voltage drops with the increase of one of said active power and a DC current flowing between said DC line and said power converter;

means for setting a reactive power reference for exchanging between said power converter and said AC power system;

reactive power control means for comparing said reactive difference and for generating a reactive current command so as to bring said reactive power difference close to zero;

current control means for generating a plurality of output voltage commands so as to coincide said AC current to said active current command and reactive current command based on said AC current, said AC voltage, said active current command and said reactive current command; and gate control means for switching said semiconductor switching devices in said power converter based on said output voltage commands.

2. The control system for a power conversion system according to claim 1, wherein in each of said control means, said active power control means includes:

means for setting an active power reference for exchanging between said power converter and said AC power system;

means for comparing said active power reference and said active power to obtain an active power difference;

means for setting a DC voltage reference for said power converter;

means for correcting said DC voltage reference by a value proportional to said active power difference to obtain a corrected DC voltage reference; and means for comparing said corrected DC voltage reference and said DC voltage to obtain a DC voltage difference and for generating said active current command so as to bring said DC voltage difference close to zero.

3. The control system for a power conversion system according to claim 1, wherein in each of said control means, said active power control means includes:

means for setting a DC voltage reference for said power converter;

means for comparing said DC voltage reference and said DC voltage to obtain a DC voltage difference;

means for setting an active power reference for exchanging between said power converter and said AC power system;

means for correcting said active power reference by a value proportional to said DC voltage difference to obtain a corrected active power reference; and means for comparing said corrected active power reference and said active power to obtain an active power difference and for generating said active current command so as to bring said active power difference close to zero.

4. The control system for a power conversion system according to claim 1:

wherein each of said control means includes means for detecting said DC current flowing between said DC line and said power converter; and wherein in each of said control means, said active power control means includes, means for setting a DC current reference flowing between said DC line and said power converter, means for comparing said DC current reference and said DC current to obtain a DC current difference, means for setting a DC voltage reference for said power converter, means for correcting said DC voltage reference by a value proportional to said DC current difference to obtain a corrected DC voltage reference, and means for comparing said corrected DC voltage reference and said DC voltage to obtain a DC voltage difference and for generating said active current command so as to bring said DC voltage difference close to zero.

5. The control system for a power conversion system according to claim 1:

wherein each of said control means includes means for detecting said DC current flowing between said DC line and said power converter; and wherein in each of said control means, said active power control means includes, means for setting an active power reference for exchanging between said power converter and said AC power system, means for comparing said active power reference and said active power to obtain an active power difference and for generating a DC current reference value so as to minimize said active power difference, means for comparing said DC current reference value and said DC current to obtain a DC current difference, means for setting a DC voltage reference for said power converter, means for correcting said DC voltage reference by a value proportional to said DC current difference to obtain a corrected DC voltage reference, and means for comparing said corrected DC voltage reference and said DC voltage to obtain a DC voltage difference and for generating said active current command so as to bring said DC voltage difference close to zero.

6. The control system for a power conversion system according to claim 1, wherein in each of said control means, said active power control means includes:

means for setting an active power reference for exchanging between said power converter and said AC power system;

means for setting a DC voltage reference for said power converter;

means for correcting said DC voltage reference by a value proportional to said active power reference to obtain a corrected DC voltage reference; and means for comparing said corrected DC voltage reference and said DC voltage to obtain a DC voltage difference and for generating said active current command so as to bring said DC voltage difference close to zero.

7. The control system for a power conversion system according to claim 1, wherein in each of said control means, said active power control means includes:

means for setting an active power reference for exchanging between said power converter and said AC power system;

means for comparing said active power reference and said active power to obtain an active power difference and for generating a DC voltage reference correction value so as to bring said active power difference close to zero, means for setting a DC voltage reference for said power converter;

means for correcting said DC voltage reference by a value proportional to said active power reference and a value proportional to said DC voltage reference correction value to obtain a corrected DC voltage reference, and means for comparing said corrected DC voltage reference and said DC voltage to obtain a DC voltage difference and for generating said active current command so as to bring said DC voltage difference close to zero.

8. The control system for a power conversion system according to claim 1, wherein:

said power converter includes a voltage source type self-commutated power converter; and said semiconductor switching device in said power converter includes a gate turn-of thyristor.

* * * * *

UNITED STATES PATENT AND TRADEMARK OFFICE
CERTIFICATE OF CORRECTION

PATENT NO. : 5,666,275
DATED : SEPTEMBER 9, 1997
INVENTOR(S) : Haruhisa INOKUCHI et al.

It is certified that error appears in the above-identified patent and that said Letters Patent is hereby corrected as shown below:

Column 14, line 33, before "difference" insert --power reference and said reactive power to obtain a reactive power--.

Signed and Sealed this

Twenty-seventh Day of July, 1999

Attest:

Q. TODD DICKINSON

*Attesting Officer*    *Acting Commissioner of Patents and Trademarks*